March 6, 1928.  
C. P. FARRELL  
AIR BRAKE  
Filed May 13, 1927
1,661,933
2 Sheets-Sheet 1
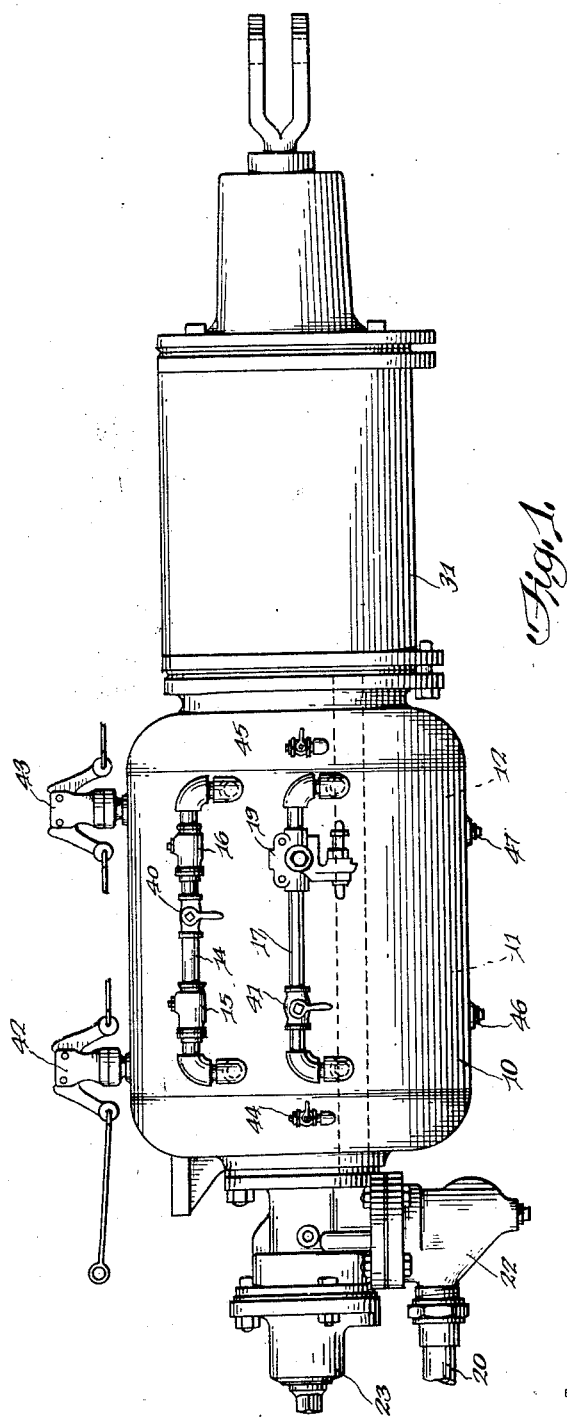
Chettie P. Farrell
INVENTOR
BY Victor J. Evans
ATTORNEY March 6, 1928. 1,661,933
C. P. FARRELL
AIR BRAKE
Filed May 13, 1927 2 Sheets-Sheet 2
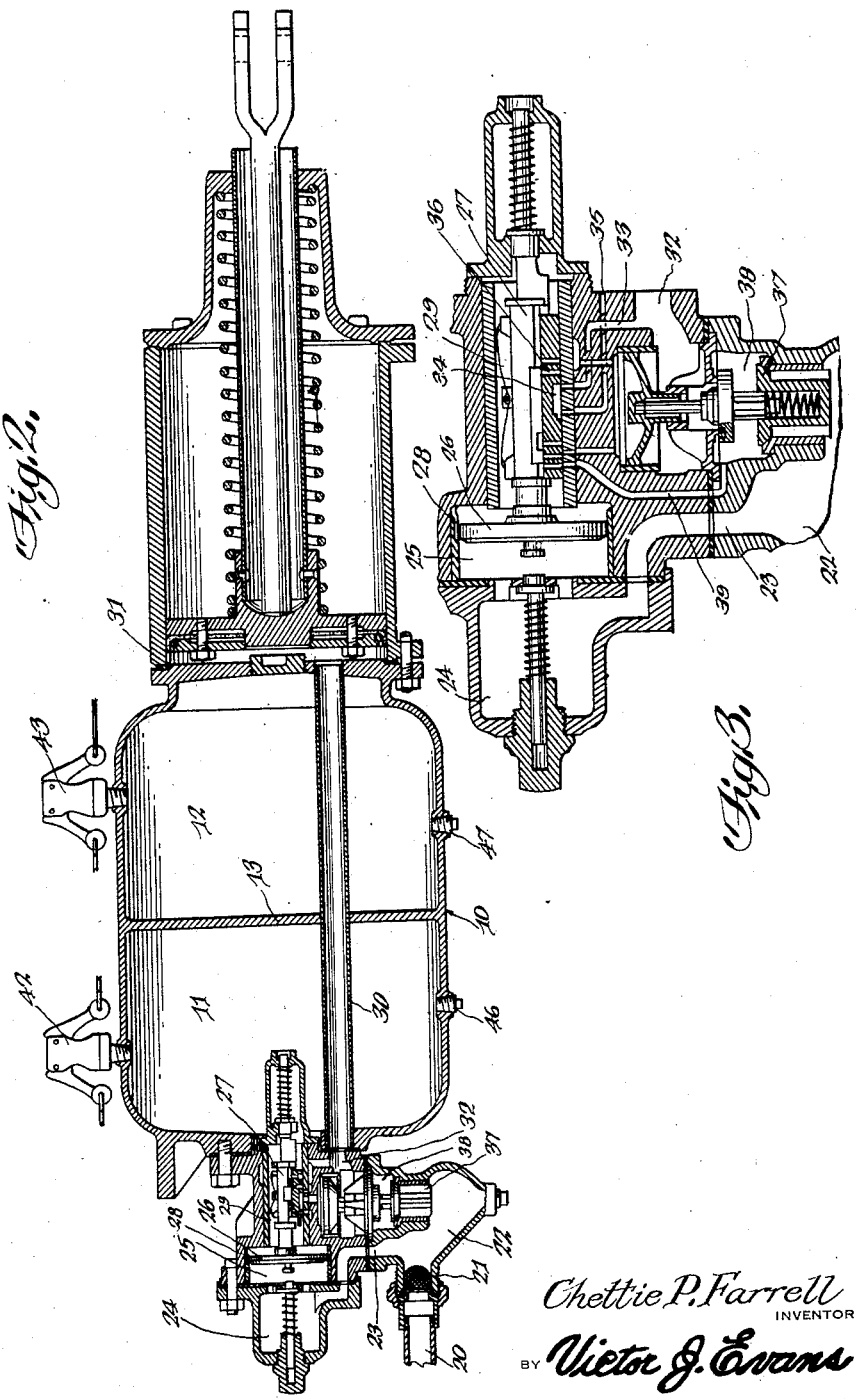

Patented Mar. 6, 1928.

1,661,933

UNITED STATES PATENT OFFICE.

CHETTIE P. FARRELL, OF DETROIT, MICHIGAN.

AIR BRAKE.

Application filed May 13, 1927. Serial No. 191,174.

This invention relates to certain novel improvements in air brakes and more particularly to air brakes such as are used in lengthy multi-car trains, such as so-called freight trains.

In hilly and mountainous regions, the operator or engineer of multi-car trains continuously applies the brakes when the train is on a down grade, in order to reduce the momentum. It is apparent that the greater the length of the train the greater will be the weight and if the grade is lengthy considerable braking will be necessary in order to control the train. Under such conditions the air supply in the air reservoirs is depleted to such an extent that the air pressure is reduced to a point so low that operation of the brakes is not possible and therefore the train is out of control.

It is therefore an object of my invention to provide an improvement in air brakes which will serve to sustain the air pressure in the reservoirs.

Another object of my invention is to provide an auxiliary storage reservoir in communication with the usual air reservoir in such a way that air stored therein will be permitted to enter the usual storage tank only at predetermined times.

It is well known that a certain amount of air leakage occurs in air reservoirs of the type described that is difficult to eliminate. In view of this it is a further object of my invention to provide an arrangement which will replenish air dissipated by leakage.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is an elevational view showing the preferred embodiment of my invention;

Fig. 2 is a longitudinal sectional view of the embodiment depicted in Fig. 1; and Fig. 3 is an enlarged sectional view of a control valve for an air brake system.

In the drawings I have illustrated only a portion of an air brake system, since the parts not illustrated in the drawings may be constructed and arranged in any conventional manner. The preferred embodiment of my invention as illustrated in the drawings embodies an air storage tank 10, which is divided into compartments 11 and 12 by a partition 13. The tank 11 is the usual air reservoir of an air brake system and the compartments 12 serves as an auxiliary reservoir. A conduit 14 connects the reservoirs or storage tanks 11 and 12 and provided therein are check valves 15 and 16 which permit passage through the conduit 14 in only one direction, that is, from the tank 11 into the tank 12.

A conduit 17 connects the tanks 11 and 12. A valve 19 which will be explained more fully hereinafter is provided in the conduit 17.

I have described the storage tank 11 and the auxiliary 12 as being formed in a consolidated structure but it is to be understood that these tanks might be made separate and that the conduits 14 and 17 might be of any length necessary to connect these tanks.

In the drawings I have illustrated a so called triple valve, which serves to control and direct the air in an air brake system. My invention is more particularly adapted for use in connection with freight trains wherein a large number of cars are coupled together. As is well known a construction is provided which enables the engineer of the train to control the brakes on the individual cars however remote they may be from the engine. This is accomplished by the employment of so called triple valves of which the one illustrated is symbolic. The intake 20 of this valve is connected to the air system of a freight train and air flows through the intake 20 into the chamber 22 of the valve through a strainer 21. The chamber 22 is provided in the valve and a passage 23 connects this chamber with a chamber 24. A chamber 25 is provided in which a head 26 of the valve structure 27 is contained, said chamber 25 having communication with the chamber 24. Referring more particularly to Fig. 3, it will be seen that the passage 28 is provided around the head 26 which establishes communication between the chamber 25 and the passage 29 which terminates in the chamber 11.

In the embodiment of the invention shown in the drawings a conduit 30 extends through the tanks 11 and 12 and establishes communication between the triple valve and the brake cylinder 31, which may be of any desired style or type. A passage 32 is provided in the triple valve which communicates with the pipe 30 and a port 33 establishes communication between the passage 32 and a chamber 34. A port 35 connects the chamber 34 with the atmosphere. When the parts are in the position shown in Fig. 3, which is the charging position, the brakes are fully released. A port 36 is provided which under certain conditions has communication with the chamber 29.

A check valve 37 is provided in the triple valve and when in open position permits passage between the chamber 22 and the chamber 38. When the parts are in the position depicted in Fig. 3 a port 39 establishes communication between the chamber 38 and the chamber 29.

As stated, when the parts are in the position depicted in Fig. 3, the valve is arranged to permit the storing of air in the tank 11. The air will pass in through the intake 20, chamber 22, passage 23, chamber 24, into chamber 25 and will force the head 26 back and thus open the passage 28, which will permit air to pass through the passage 29 into the storage tank 11.

A hand operated valve 40 is provided in the conduit 14 and when this valve is in open position air will flow from the chamber 11 into the chamber 12 through the conduit 14 during the time when the triple valve is in charging position. As it has been stated the check valves 15 and 16 prevent air flowing through the conduit 14 from the tank 12 into the tank 11. As soon as air is stored in the tank 12 a pressure will be built up which will prevent air flowing through the conduit 17 and the tank 11 into the tank 12, since the valve 19 is so arranged. It is apparent that any air stored in the tank 12 will be retained therein until the valve 19 functions to permit its flowing into the tank 11. A hand operated valve 41 is provided in the conduit 17 which is preferably opened and closed at the same time the valve 40 is arranged, these valves only being closed at times when the auxiliary tank 12 is deemed unnecessary.

Relief valves 42 and 43 are provided on the tanks 11 and 12 respectively. These relief valves are similar to the relief valves at present used on air storage tanks of air brake systems. Testing valves 44 and 45 are provided on the tanks 11 and 12 and are adapted to have applied thereto testing gauges for ascertaining the air pressure within the tanks. To adjust the valve 19 for the desired air pressure passing therethrough a gauge is applied to the valve 44 to indicate the desired pressure within the tank 11 and should such pressure be excessive the valve 42 may be opened to reduce the pressure to the required degree. Drain cocks 46 and 47 are provided in the tanks 11 and 12 respectively for purposes well understood in the art.

When it is desired to operate the brakes of a train, the engineer operates his control valve so as to reduce the pressure in the air line of the freight train which reduces the pressure into the intake 20 of the triple valve. This reduces the pressure in the chamber 25 and permits the head 26 to close the passage 28. Movement of the head 26 also moves the valve structure 27 which moves the chamber 34 out of engagement with the port 33 and thus closes the brake system to atmospheric pressure. The port 36 will register with the port 33 and will permit the air in the tank 11 to flow through the ports 36 and 33, passage 32, and pipe 30 into the brake cylinder 31 and cause actuation of the brake operating members. Other actions may take place in the triple valve, but the foregoing is sufficient to explain how the air contained in the tank operates the brakes. Further the triple valve is arranged for quick acting or emergency working and also arranged so that air may be supplied to the brake cylinder in any other manner, but since these things constitute no part of my invention I shall not describe them in detail herein.

I have explained how air is withdrawn from the reservoir 11 and it is apparent if the brake system be continually operated so as to produce a braking condition the air supply in the tank 11 will be depleted. Since it cannot be replenished until after the brakes have been fully released so as to permit the valve to assume its charging position and further to permit the air pressure to be built up in the train air line. I have, to alleviate this condition, provided the tank 12.

When the pressure in the tank 11 falls to a predetermined low point, the valve 19 opens. Since this valve is adapted to be held closed by the air pressure in tank 11 it is apparent that the valve 19 is pressure controlled. As soon as sufficient air has been drawn from the tank 12 to build up the pressure in the tank 11 the valve 19 will close.

At the start of the operation of the apparatus, a small quantity of air will travel through the conduit 17 from the tank 11 into the tank 12 but as soon as sufficent air is stored in the tank 12 to build up a pressure, the valve 19 will function so as to prevent further air flowing through this conduit. Therefore, normally, the air travel is unidirectional, that is, it is in one direction only for the air travels from the tank 11 into the tank 12 through the conduit 14 and from the tank 12 into the tank 11 through the conduit 17, these parts forming a circuit through which the travel is in only one direction.

The tank 12 is constructed of a size sufficient to contain a reserve of air sufficient to maintain proper air pressure on very long grades, the size thereof varying in accordance with the topography of the roadbed.

It is apparent that I have produced a device which will obviate the likelihood of the brake system of a freight train being completely exhausted and therefore the engineer will be able to control the train under all conditions even at the end of an extremely long down grade run.

The double chamber auxiliary air reservoir for freight cars insures better train control more especially on long trains or on trains that are operated through mountainous country.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. An air brake system including an air storage tank, an auxiliary tank, means connecting said tanks forming a circuit affording free communication in one direction in one part of the circuit and affording controlled communication in another part.

2. An air brake system including an air storage tank, an auxiliary storage tank, conduits connecting said tanks, one of said conduits affording communication in only one direction, the other of said conduits affording regulated communication only in one direction.

3. An air brake system including an air storage tank, an auxiliary tank, a conduit connecting said tanks embodying means permitting passage only from said storage tank into said auxiliary tank, another conduit connecting said tanks embodying means permitting passage only from said auxiliary tank into said storage tank.

4. An air brake system including an air storage tank, an auxiliary tank, a conduit connecting said tanks embodying means permitting passage only from said storage tank into said auxiliary tank, another conduit connecting said tanks embodying means permitting passage only from said auxiliary tank into said storage tank, the means in said second mentioned conduit being pressure controlled and permitting passage only at predetermined times.

5. A device of the class described including a tank divided into separate compartments, and conduits connecting said compartments, each conduit affording communication in only one direction.

6. A device of the class described including a tank divided into separate compartments, and conduits connecting said compartments, each conduit affording communication in only one direction, one of said conduits embodying means permitting passage only at predetermined times.

In testimony whereof I affix my signature.

CHETTIE P. FARRELL.